US007778875B2

(12) United States Patent
Schauser et al.

(10) Patent No.: US 7,778,875 B2
(45) Date of Patent: Aug. 17, 2010

(54) SYSTEMS AND METHODS FOR GENERATING ADVERTISER RECOMMENDATIONS FROM USERS OF WORKFLOW SOFTWARE

(75) Inventors: Klaus Schauser, Goleta, CA (US); Jon Walker, Santa Barbara, CA (US)

(73) Assignee: AppFolio, Inc., Goleta, CA (US)

( * ) Notice: Subject to any disclaimer, the term of this patent is extended or adjusted under 35 U.S.C. 154(b) by 758 days.

(21) Appl. No.: 11/470,141

(22) Filed: Sep. 5, 2006

(65) Prior Publication Data

US 2008/0059295 A1  Mar. 6, 2008

(51) Int. Cl.
*G06Q 30/00* (2006.01)
(52) U.S. Cl. .................... 705/14.72; 705/14.4
(58) Field of Classification Search .......... 705/14, 705/14.4, 14.72
See application file for complete search history.

(56) References Cited

U.S. PATENT DOCUMENTS

| 6,456,981 | B1 | 9/2002 | Dejaeger et al. |
| 6,603,838 | B1 | 8/2003 | Brown et al. |
| 6,931,254 | B1 | 8/2005 | Egner et al. |
| 7,003,478 | B1 * | 2/2006 | Choi ............................ 705/14 |
| 7,292,990 | B2 * | 11/2007 | Hughes ......................... 705/9 |
| 7,451,177 | B1 | 11/2008 | Johnson et al. |
| 7,496,841 | B2 * | 2/2009 | Hadfield et al. ............. 715/255 |
| 2005/0005242 | A1 | 1/2005 | Hoyle |
| 2005/0198116 | A1 * | 9/2005 | Appleman et al. .......... 709/203 |
| 2005/0204381 | A1 | 9/2005 | Ludvig et al. |
| 2005/0222865 | A1 * | 10/2005 | Fox .............................. 705/1 |
| 2005/0251539 | A1 | 11/2005 | Parekh et al. |
| 2006/0095329 | A1 | 5/2006 | Kim |
| 2007/0179846 | A1 | 8/2007 | Jain et al. |
| 2008/0005313 | A1 | 1/2008 | Flake et al. |
| 2008/0091537 | A1 | 4/2008 | Miller et al. |
| 2008/0195457 | A1 | 8/2008 | Sherman et al. |
| 2008/0288874 | A1 | 11/2008 | Hoyle |

OTHER PUBLICATIONS

International Search Report from PCT/US07/77597 dated Sep. 23, 2008.
Written Opinion of the International Searching Authority from PCT/US07/77597 dated Sep. 23, 2008.
"Encyclopedia of Technology Terms" Que Publishing 2002; pp. 805-806.

* cited by examiner

*Primary Examiner*—James W Myhre
(74) *Attorney, Agent, or Firm*—Choate Hall & Stewart LLP; John D. Lanza

(57) ABSTRACT

A method for using a workflow server to provide targeted advertisements recommended by users of workflow software includes: receiving, at a server from a user completing a workflow, information corresponding to a step in the workflow and an advertiser, the advertiser recommended by the user in connection with the step in the workflow; identifying, by the server, an advertisement corresponding to the recommended advertiser; and transmitting, from the server to a second client, a markup language page corresponding to the step in the workflow, the markup language page including the identified advertisement. Corresponding systems are also described.

21 Claims, 7 Drawing Sheets

SYSTEMS AND METHODS FOR GENERATING ADVERTISER RECOMMENDATIONS FROM USERS OF WORKFLOW SOFTWARE

FIELD OF THE INVENTION

The present invention relates to computer software and network applications, and, more specifically, means of advertising within workflow software.

BACKGROUND OF THE INVENTION

Workflow software and services are common in many industries. Workflow software may be used to accomplish or aid in several occupational or industry specific tasks. Workflow software may include any software that performs or aids in accomplishing a discrete job-related task. Examples of workflow software may include inventory management software, personnel tracking software, accounting software, enterprise resource planning (ERP) software, and trip or event planning software. Workflow software often is customized for a given industry or occupation to provide optimal functionality. For example, a workflow designed for a health care provider may have built-in functions for handling health insurance payments, or complying with government regulations.

However, a substantial number of industries, occupations, and roles that may benefit from workflow software may be too small to support the costs involved in developing specialized workflow software. These industries, occupations, or roles may be unable to support commissioning the development of or otherwise purchasing workflow software tailored to their needs. To solve this problem, a maker of workflow software may try to reduce costs to the industries by generating revenue through advertisements displayed within the workflows, in addition to or rather than simply selling the workflow software.

However, although advertisements displayed in a workflow may generate additional revenue, the focused and customized nature of workflow software may result in general purpose advertisements failing to generate significant success rates. Further, identifying particular advertisers of interest to a given industry, occupation, or role may be difficult without specialized knowledge or experience corresponding to the industry, occupation, or role. A member of an industry may not trust advertisements of products or services from vendors not known to the member and without recommendations from other members of the industry. Significant costs may also be involved in manually contacting potential advertisers, and manually selling the advertising space available in workflow software. Selling advertising space within a workflow may also be difficult if the potential advertiser is unsure of the demand of users of the workflow for an advertiser's product or service.

Thus there exists a need to efficiently leverage the knowledge of workflow software users to locate potential advertisers and advertisements for workflow software. There further exists a need to leverage this knowledge in an efficient, automated way to produce targeted, trustworthy advertisements within workflow software.

BRIEF SUMMARY OF THE INVENTION

In one aspect, the present invention is a method for displaying targeted advertisements to users of workflow software. The method comprises: receiving, from an identified user, a request to display a step in a workflow, the workflow corresponding to a given industry; determining, based on (i) the identified user, (ii) the step in the workflow, and (iii) the corresponding industry, an advertisement to be displayed in conjunction with the step in the workflow; and transmitting, to the identified user, the requested workflow step and the determined advertisement.

In another aspect, the present invention is a computer implemented system for displaying targeted advertisements to users of workflow software, the system comprising: a workflow server which receives, from an identified user, a request to display a step in a workflow, the workflow corresponding to a given industry; determines, based on (i) the identified user, (ii) the step in the workflow, and (iii) the corresponding industry, an advertisement to be displayed in conjunction with the step in the workflow; and transmits, to the identified user, the requested workflow step and the determined advertisement.

BRIEF DESCRIPTION OF THE DRAWINGS

The foregoing and other objects, aspects, features, and advantages of the invention will become more apparent and better understood by referring to the following description taken in conjunction with the accompanying drawings, in which.

DETAILED DESCRIPTION OF THE INVENTION

Figure 1:
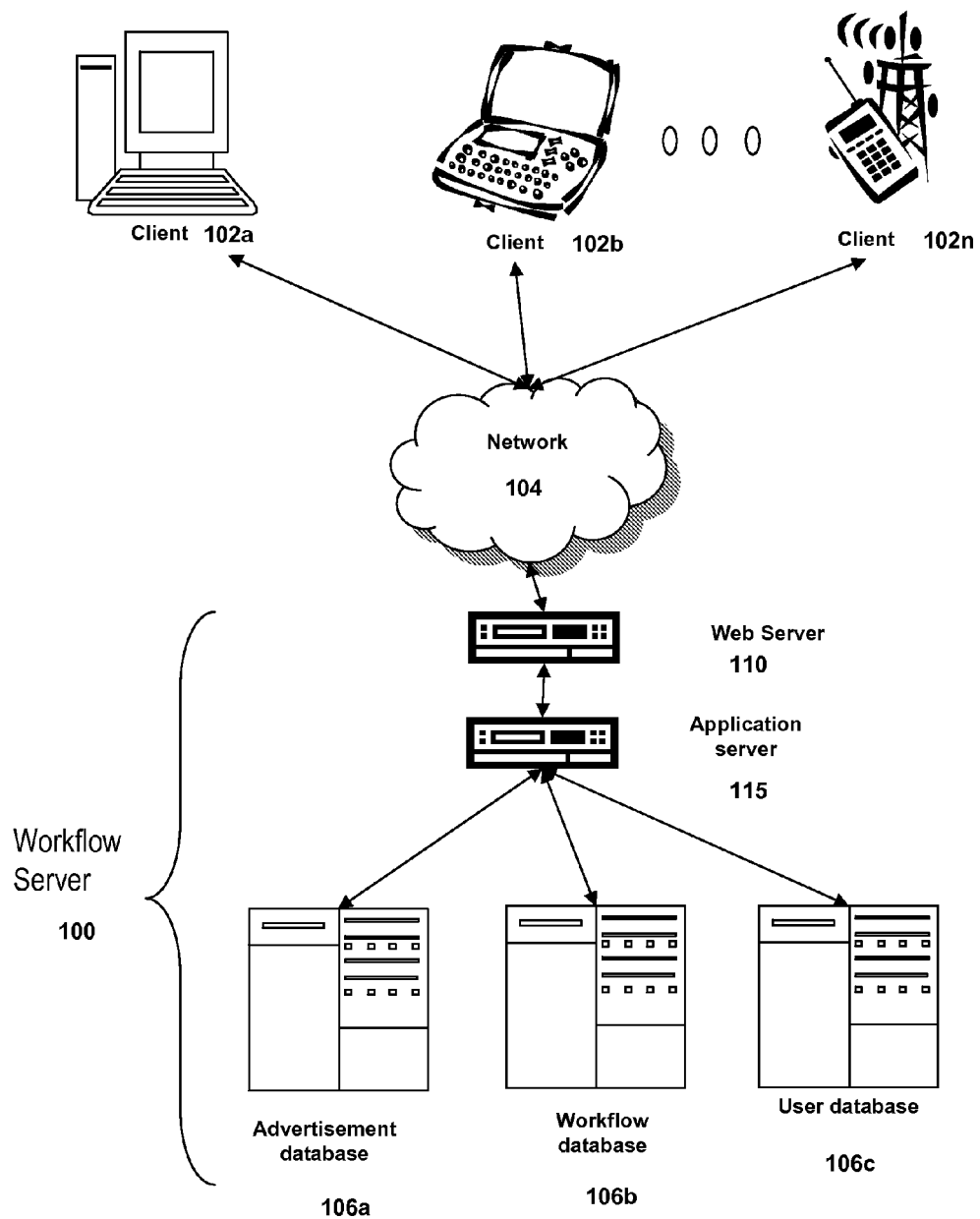
FIG. 1 is a block diagram of one embodiment of a system for deploying workflows to computer users.

Referring now to FIG. 1, a block diagram of one embodiment of a system for deploying workflows to computer users is shown. In brief overview, a number of clients, 102a, 102b, . . . 102n (generally 102), are connected via a network 104 to a workflow server 100. The workflow server 100 may comprise a number of elements including a web server 110, an application server 115, and a number of databases including an advertisement database 106a, a workflow database 106b, and a user database 106c.

In some embodiments, some or all of the workflow server elements may occupy the same physical machine, and may share any resources, including processors, memory, and communication links. In other embodiments, a workflow server element may be distributed across multiple scalable, fault-tolerant, redundant machines. In some embodiments, these machines may be geographically distributed across a number of sites.

Still referring to FIG. 1, now in greater detail, a number of clients 102 are shown. A client may comprise any computing device capable of sending or receiving information. Examples of clients 102 may include personal computers, laptop computers, desktop computers, personal digital assistants, and mobile phones. A client 102 may include a display device, such as a monitor or screen, for displaying a received workflow to a user, and an input device, such as a keyboard or mouse, for accepting input of data corresponding to the workflow.

As shown, the clients 102 are connected to a workflow server 100 via a network 104. The network 104 may comprise the Internet, local networks, web servers, file servers, routers, load balancers, databases, computers, servers, network appliances, or any other computing devices capable of sending and receiving information. The network 104 may comprise computing devices connected via cables, IR ports, wireless signals, or any other means of connecting multiple computing devices. The network and any devices connected to the networks may communicate via any communication protocol used to communicate among or within computing devices, including without limitation SSL, HTML, XML, RDP, ICA, FTP, HTTP, TCP, IP, UDP, IPX, SPX, NetBIOS, NetBEUI, SMB, SMTP, POP, IMAP, Ethernet, ARCNET, Fiber Distributed Data Interface (FDDI), RS232, IEEE 802.11, IEEE 802.11a, IEE 802.11b, IEEE 802.11g and direct asynchronous connections, or any combination thereof. The network 104 may comprise mobile telephone networks utilizing any protocol or protocols used to communicate among mobile devices, including AMPS, TDMA, CDMA, GSM, GPRS or UMTS. The network may comprise a plurality of physically distinct networks, and the network may comprise a plurality of sub-networks connected in any manner.

A workflow server 100 may comprise any server or servers capable of sending and receiving data. A workflow server 100 may perform any function related to the delivery and processing of workflows, including without limitation serving web pages corresponding to workflow steps, receiving and processing web page input, storing user, advertiser, and workflow information, and contacting and transacting with external resources. In one embodiment, a workflow server 100 may be implemented using an application server model, wherein a web server 110 handles web requests from clients and serves pages, an application server 115 coordinates workflow logic, and a number of databases 106 manage data, including without limitation user data, workflow data, and advertiser data. In another embodiment, a workflow server may be implemented using a distributed, scalable, fault-tolerant, redundant server architecture.

Figure 2:
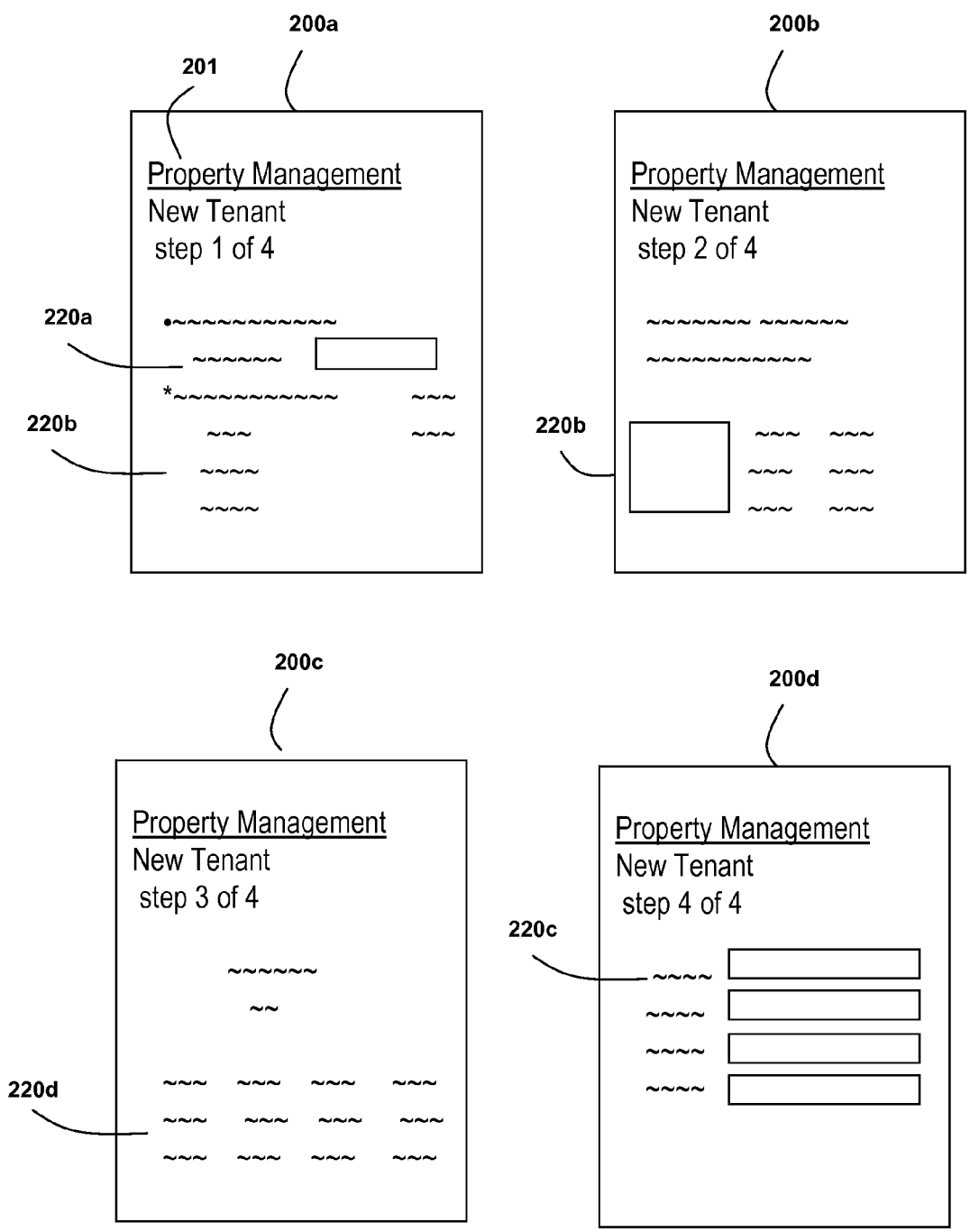
FIG. 2 is a block diagram of one example of a workflow.

Referring now to FIG. 2, a block diagram of one example of a workflow is shown. In brief overview, the example workflow comprises a plurality of steps 200a, 200b, 200c, 200d (generally 200). The steps may comprise one or more components 220, which may comprise input components, text, images, animations, advertisements, and any other input/output means.

Still referring to FIG. 2, now in greater detail, a workflow may comprise any series of components which allow a user to manage or complete a given task or situation. One example of a workflow might be a series of components which allow a property manager to handle the functions associated with a recent vacancy, such as scheduling a cleaning, returning deposits, and advertising for a new tenant. Another example of a workflow might be a series of components which allow an event planner to perform tasks associated with managing a new event, such as ordering food and drinks, scheduling staff, reserving space, and printing invitations.

A workflow may comprise any input/output components. In one embodiment, a workflow may comprise a series of HTML pages. In other embodiments, a workflow may comprise a series of pages in any markup language. A workflow may include any input means including text fields, buttons, radio buttons, checkboxes, menus, pull-down menus, and sliders. A workflow may include any means for creating dynamic user interactions, including without limitation scripts, Flash, Java applets, and Ajax.

In some embodiments, a workflow may be specifically adapted for a given industry or market niche. For example, a workflow may be adapted specifically to property management functions. Or, for example, a workflow may be specifically adapted to veterinary services management. Other examples of industries and services which workflows may be adapted for include, without limitation property management, heath care studios, beauty salons, yoga studios, martial arts studios, contracting, roofing, plumbing, law, accounting, restaurants, hotels and motels, bed and breakfasts, storage, limousines, gardeners, tree services, veterinary services, chiropractics, dentists, water delivery, carpet cleaners, window cleaners, house cleaners, wedding planners, photographers, temp services, auto repair, auto parts, shipping, inventory/warehousing, construction and travel agencies. In other embodiments, a workflow may be customized for a given role. For example, a workflow may be customized for an accounts receivable supervisor, regardless of industry. In still other embodiments, a workflow may be customized for a given role within a given industry. For example, a workflow may be customized for a human resources director of a law firm, or a human resources manager of a legal staffing agency.

Figure 3:
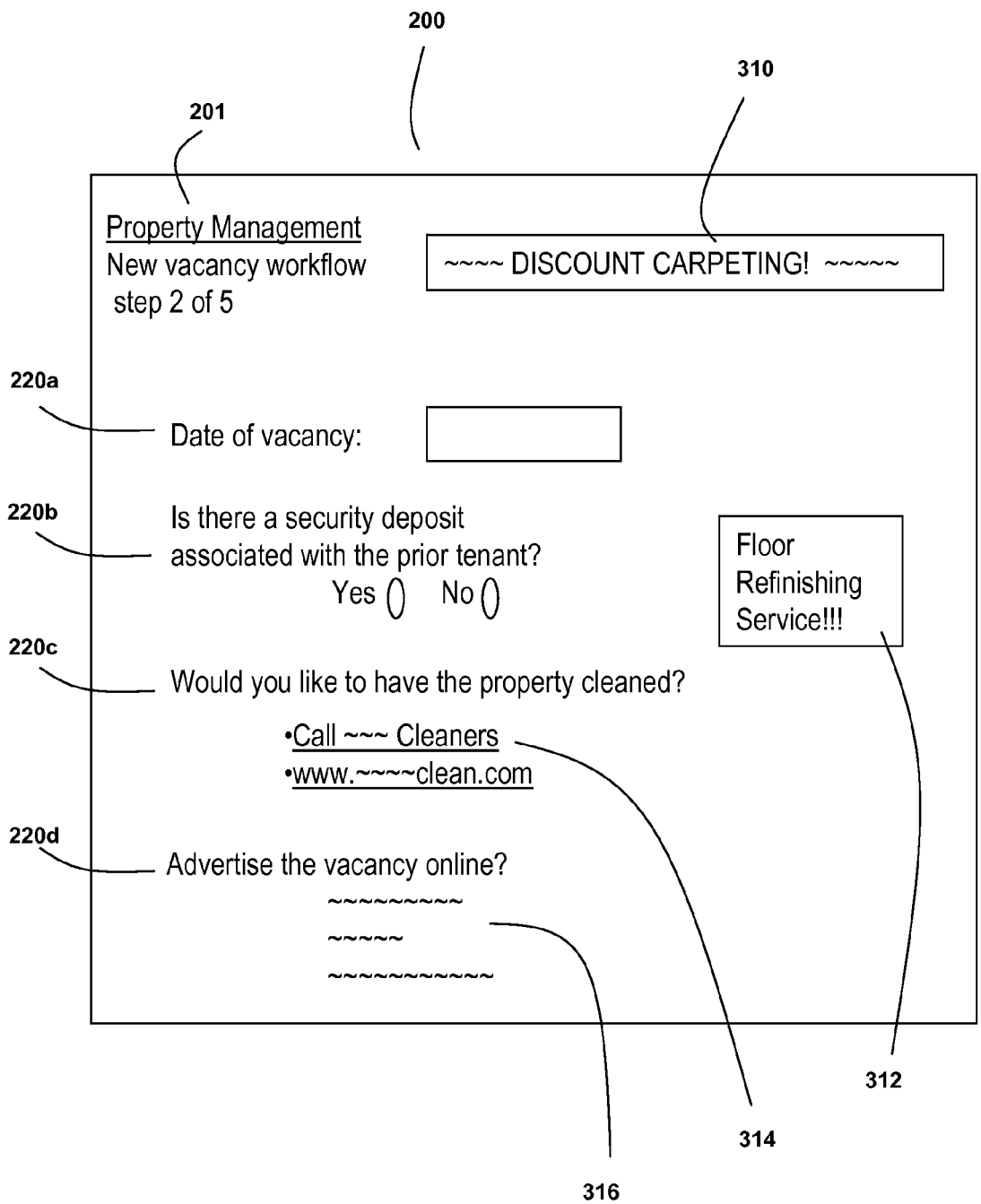
FIG. 3 is a block diagram of an example workflow step with targeted advertising.

Referring now to FIG. 3, a block diagram of an example workflow step with targeted advertising is shown. In brief overview, a workflow step 200 comprises an indication of the workflow step 201, and a number of components 220a, 220b, 220c, 220d. The step also comprises a number of advertisements 310, 312, 314, 316, which may be integrated with the workflow components to varying degrees.

Still referring to FIG. 3, now in greater detail, an example workflow step comprises an indicator 201 informing the user of the workflow, and the current step in the workflow being displayed. In the example shown, the workflow step 200 is the second step in a workflow created for property managers to manage new vacancies. An indicator 201 may notify the user of the industry, role, or occupation corresponding to the workflow. In some embodiments, an indicator 201 may comprise a notification informing the user of how many times a particular workflow has been completed. In some embodiments, an indicator 201 may not be displayed.

The example workflow step 200 comprises a number of components 220a, 220b, 220c, 220d (generally 220). A component 220 may comprise any input and output grouping that enables a user to complete or specify information corresponding to a discrete task or item. In addition to the examples shown, example components may comprise an order component, a purchase component, an address entry component, a login component, a calendar entry, a chart, a ledger entry, and a general input or question component.

The example workflow step 200 comprises a number of advertisements. An advertisement in a workflow may comprise any form of advertising used in conjunction with web pages or other computer displays. Advertisements in workflows may comprise text, links, images, graphics, sounds, animations, movies. Advertisements in workflows may also comprise interactive components. For example an advertisement for a cleaning service might prompt a user to enter an address to locate a franchise of the cleaning service near a given property. Or for example, an advertisement may be a click-to-call advertisement, wherein clicking the ad places a phone call to the advertiser via the computer displaying the workflow. In other embodiments, an advertisement may comprise any other means for contacting the advertiser, including electronic mail, fax, SMS, instant messaging, and chat functionality.

In one embodiment, advertisements may be displayed as banner advertisements 310. Banner advertisements 310 may be displayed a the top or bottom, along a side, or in the middle of a workflow step. In some embodiments, banner advertisements 310 may be selected for display based on a correlation between the advertisement and the content of a workflow, a workflow step, or a component within a workflow step.

An advertisement 312 may be displayed in proximity to or otherwise associated with a workflow component. For example, the advertisement may be displayed as a textbox near the component. Or, for example, the advertisement may be a pop-up window displayed near the component. In some embodiments, a component-associated advertisement 312 may be selected for display based on a correlation between the advertisement and the content of a workflow, a workflow step, or a component within a workflow step. In one embodiment, an advertisement may take the form of a tip or guide with respect to the workflow step or component.

An advertisement 314 may also be integrated with a component itself. In the embodiment shown, an advertisement for a cleaning service 314 is displayed as an option within a component 220c relating to property cleaning. Advertisements may be integrated with components in any way, including, without limitation, as menu options, subquestions, images, popup text, rollover text, related links, and tips.

An advertisement 316 may also be displayed as a self-contained component. An advertisement may be displayed in a substantially similar manner to other non-advertising components, in such a way that the advertisement has the appearance of being an additional workflow item. For example, in the embodiment shown, the "advertise the vacancy online?" component 316 may comprise an advertisement for a given online listing service, which may pay a fee to the publisher of the workflow software to have the "advertise online" question included in the workflow, along with a link to the online listing service.

In some embodiments, advertisements displayed within a workflow may add value to the workflow user experience. Targeted advertisements may provide users with access to products, services, and information otherwise unavailable in workflow software. In some embodiments, an advertisement may be chosen to be displayed in a substantially similar manner to other non-advertising components as a result of the advertisement offering additional value to the workflow user. For example, if a workflow server determines that a significant number of users of an event planning workflow respond to an advertisement for an event security provider, the event security provider's advertisement may be displayed similarly to other components in the event planning workflow to reflect the frequent use and value added.

Figure 4:
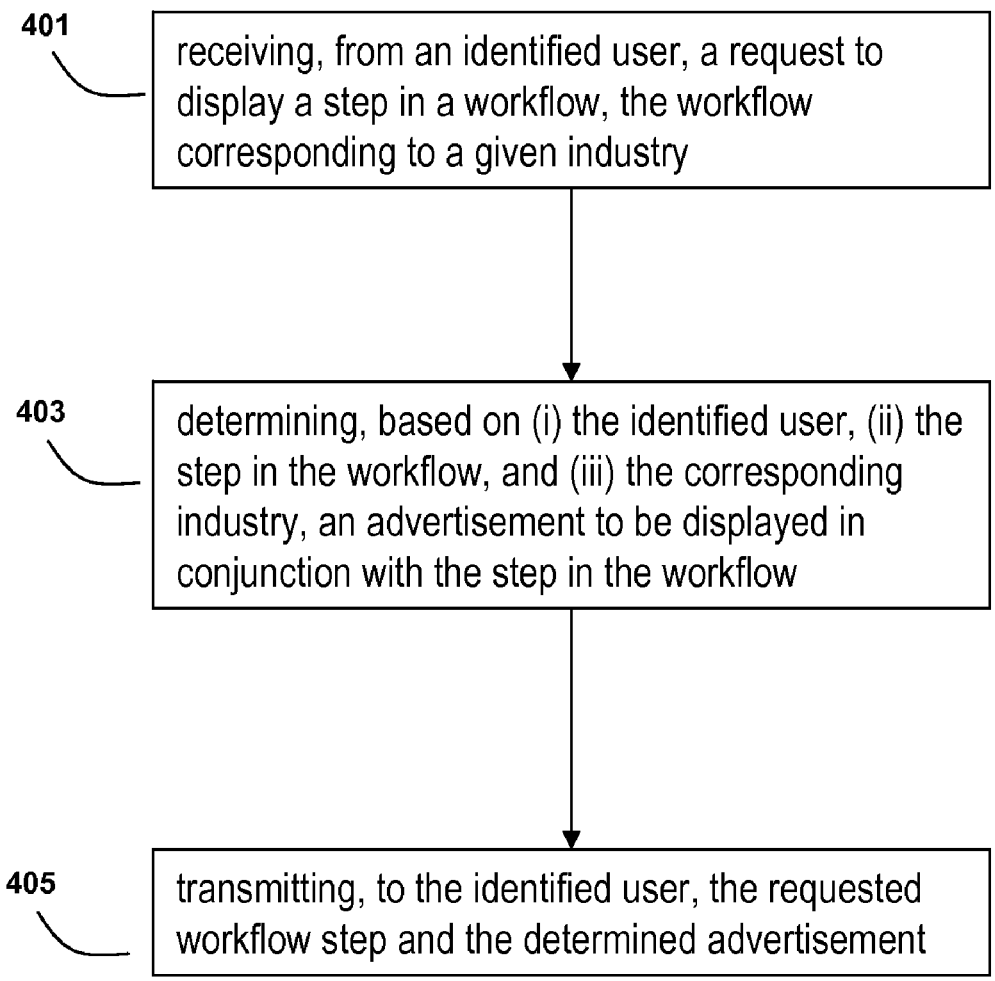
FIG. 4 is a method for displaying targeted advertisements to users of workflow software.

Referring now to FIG. 4, a flow diagram of a method for displaying targeted advertisements to users of workflow software is shown. In brief overview, the method comprises: receiving, from an identified user, a request to display a step in a workflow, the workflow corresponding to a given industry (step 401); determining, based on (i) the identified user, (ii) the step in the workflow, and (iii) the corresponding industry, an advertisement to be displayed in conjunction with the step in the workflow (step 403); and transmitting, to the identified user, the requested workflow step and the determined advertisement (step 405). In the description below, the method will be described in the context of being performed by a workflow server. In other embodiments, the method may be performed by any software and computing device, including workflow software executing on a client.

Still referring to FIG. 4, now in greater detail, a method for displaying targeted advertisements comprises receiving, from an identified user, a request to display a step in a workflow, the workflow corresponding to a given industry (step 401). In some embodiments, the user may be identified via a logon. In other embodiments, a user may be identified by an internet address the user is connecting from. In still other embodiments, the user may be identified by information provided in a previous workflow step.

In some embodiments, the request to display a step in a workflow may comprise an HTTP request from a client. In one embodiment, a client may request to display a step in a workflow by requesting the first step of a workflow in a workflow selection screen. In another embodiment, a client may request to display a step in a workflow by selecting a "next" or "continue" component on a workflow step, which then transmits a request to display the next step in the current workflow.

In some embodiments, a workflow server may determine, based in information in a client request, which step of a workflow to display. For example, in a property management workflow, the workflow server may determine whether to display a property tax payment step based on the location the user has entered for the property and the current time of the year. Or, for example, if a user has indicated on a previous step that a security deposit was not required for a given property, the workflow server may determine not to display a workflow step corresponding to returning a security deposit, and move to a third step in the workflow.

After receiving, from an identified user, a request to display a step in a workflow, the workflow corresponding to a given industry (step 401), a workflow server 100 may then determine, based on (i) the identified user, (ii) the step in the workflow, and (iii) the corresponding industry, an advertisement to be displayed in conjunction with the step in the workflow (step 403). In some embodiments, a workflow server may access data contained in an advertisement and user database in making the determination.

In some embodiments, a workflow server may maintain an advertising history with respect to a given workflow, a given industry corresponding to the workflow, and any users of the given workflow. A workflow server may use the advertising history to successively target an advertisement to an area generating the highest response for the advertisement. This successive targeting may be done with respect to an industry, the workflow, a step in a workflow, a component in a workflow, a user, or an occupational role of a user. For example, an advertisement for a paper goods outlet may be displayed in a number of workflows. In some embodiments, a random factor may be used to determine the initial workflows and workflow steps in which the advertisement will be displayed. The workflow server may then determine that the advertisement generates the most responses when displayed in conjunction with an event planning workflow. The workflow server may then further determine that the advertisement generates the most responses when displayed within a given step in the event planning workflow. The workflow server may then track the users who respond to the paper goods advertisement and determine to continue showing the advertisement to those users, or show other paper goods related advertisements to those users. The workflow server may employ any statistical correlation techniques in analyzing an advertising history and subsequently determining an advertisement to display.

In one embodiment, a workflow server may count and analyze user clicks for purposes of advertisement targeting.

In another embodiment, a workflow server may count and analyze time that a user has spent accessing or viewing a given advertisement. In still other embodiments, a workflow server may count and analyze the number of completed sales an advertisement has generated.

In one embodiment, determining an advertisement to be displayed in conjunction with the step in the workflow (step 403) may comprise determining, based on at least one prior input from the identified user, an advertisement to be displayed in conjunction with the step in the workflow. For example, a user may have previously ordered cleaning services through a given workflow, and thus an advertisement for a given cleaning service may be displayed to the user during a subsequent time the user is accessing the workflow. Or, for example, a user may have previously clicked on an advertisement for landscaping services, and thus other advertisements for landscaping services may be displayed during a subsequent workflow session. Or, for example, a user may not have clicked on a previously displayed advertisement for a plumbing supply outlet, and thus the workflow server may determine to not show advertisements for plumbing supplies in subsequent workflow sessions.

In another embodiment, determining an advertisement to be displayed in conjunction with the step in the workflow (step 403) may comprise determining, based on at least one prior input from a second user who previously requested to display the workflow, an advertisement to be displayed in conjunction with the step in the workflow. A workflow server may determine based on one or more previous users' response to an advertisement that the advertisement has a given probability of a successful response when displayed with the workflow. In some embodiments, a workflow server may identify users who share a given occupational role, geographic location, or any other properties or preferences. The workflow server may then display advertisements which received a successful response from one user to users who share one or more of that user's characteristics.

In some embodiments, a workflow server may determine, based on a geographic location identified with the user, an advertisement to be displayed in conjunction with the step in the workflow. The workflow server may identify the geographic location of the user by any means, including registration information, previous inputs into workflows, and IP addresses. In some embodiments, a workflow server may determine an advertisement to display based on a geographic location of a user input. For example, in an event planning workflow, if a user inputs an event location as Toledo, Ohio, the workflow server may then determine to display ads for services and stores in the Toledo area, even if the user is located elsewhere.

After determining an advertisement to be displayed in conjunction with the step in the workflow (step 403), the workflow server may transmit, to the identified user, the requested workflow step and the determined advertisement (step 405). The workflow step may be transmitted using any protocol and via any network. In one embodiment, the workflow step may be transmitted via an HTTP connection to a client operated by the user.

In some embodiments, the workflow server may determine a location for the advertisement within the workflow step based on at least one of the following: previous input from the user, previous input from a second user identified with the given industry, a random factor, or a predetermined ranking of advertisers. For example, the workflow server may determine that the advertisement corresponds to a specific component of the workflow step, and then include the advertisement in a location near the component. Or, for example, the workflow server may determine that a given advertisement has a high success rate, and then display the advertisement in a prominent position. Or, for example, the workflow server may prioritize advertisements based on fees received from advertisers, and then display higher priority advertisements in more prominent locations.

In addition to the techniques for targeting advertisements described above, other techniques may also be used to better target advertisements to users of workflow software. One technique may be to leverage the knowledge of users of the workflow software by having the users recommend advertisers. The users may recommend advertisers that the users have had prior dealings with, or are otherwise affiliated with and know to be interested in the industry serviced by a workflow. This technique may be referred to as community recommended advertising, in that it leverages recommendations from a user community to better deliver targeted, relevant advertisements to that user community.

Figure 5:
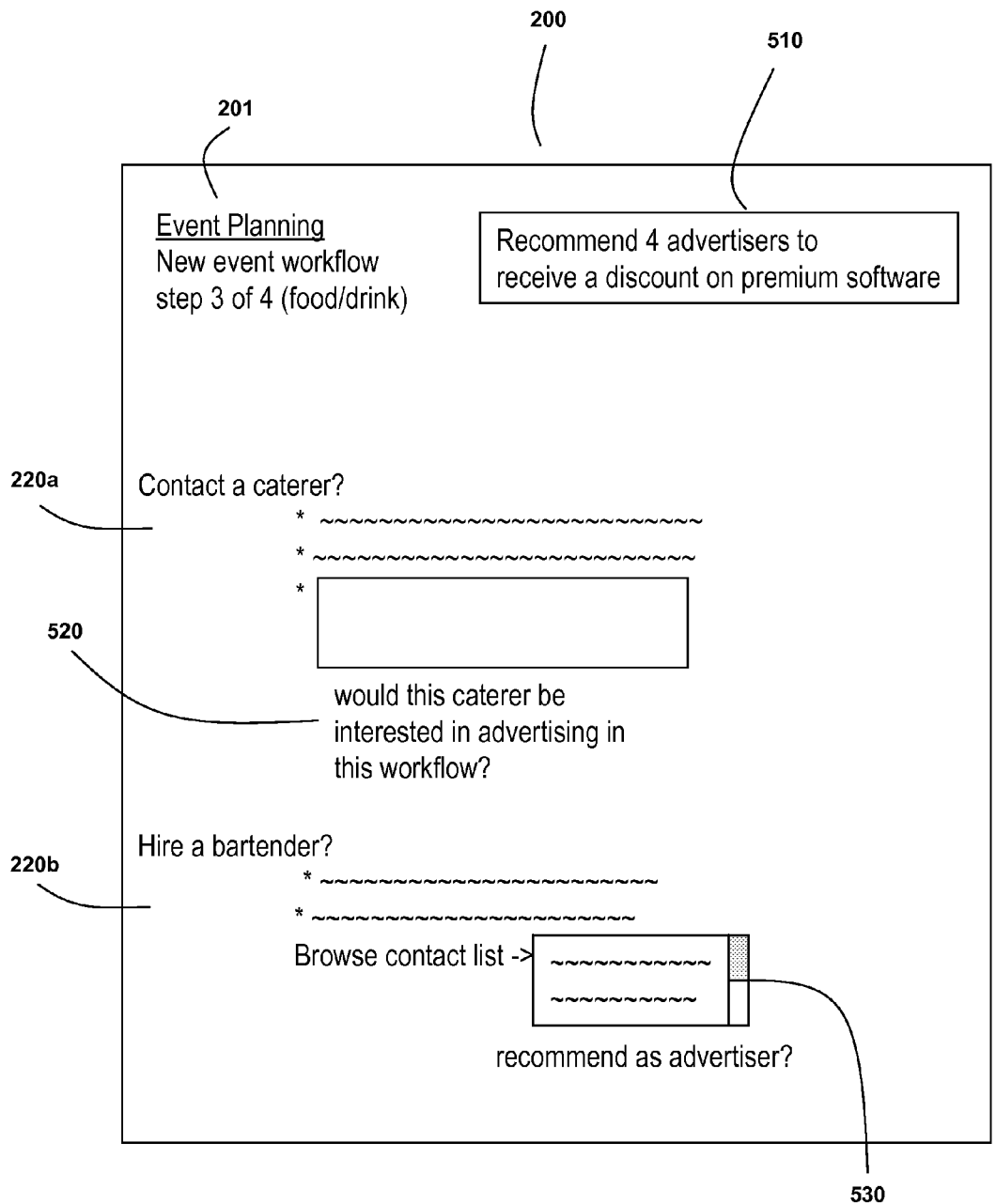
FIG. 5 is an example workflow step enabling community recommended advertising.

Referring now to FIG. 5, an example workflow step enabling community recommended advertising is shown. In brief overview, a workflow step 200 comprises a banner indicating a promotion relating to advertiser recommendations 510. The workflow step also comprises a number of means for users of the workflow to recommend potential advertisers 520, 530.

Still referring to FIG. 5, now in greater detail, a banner 510 may be displayed to users of a workflow indicating a promotion relating to advertiser recommendation. In some embodiments, a promotion relating to advertiser recommendations may be displayed to users at logon, or by any other communication means, such as electronic mail. A promotion relating to advertiser recommendations may comprise any means for generating advertiser recommendations from users. In the example shown, a user recommending a certain number of advertisers may receive a free upgrade to their workflow software. In other embodiments, incentives for advertiser recommendations may include coupons, free offers, or additional workflow software components or functionality. In one embodiment, a user who recommends an advertiser who then advertises on a workflow may be awarded a certain percentage of the advertising revenue from the advertiser.

A workflow may use any means to solicit and provide input for user recommended advertisers. In some embodiments, inputs for user recommended advertisers may be integrated within a workflow step. For example, if a component of a workflow step prompts a user to enter contact information for a business or person relating to the workflow, the workflow step may also comprise a checkbox or other input means for allowing a user to specify that the identified contact may be interested in advertising on the workflow 520. In other embodiments, a workflow step may solicit advertiser recommendations from a user's preexisting contact list 530.

Figure 6:
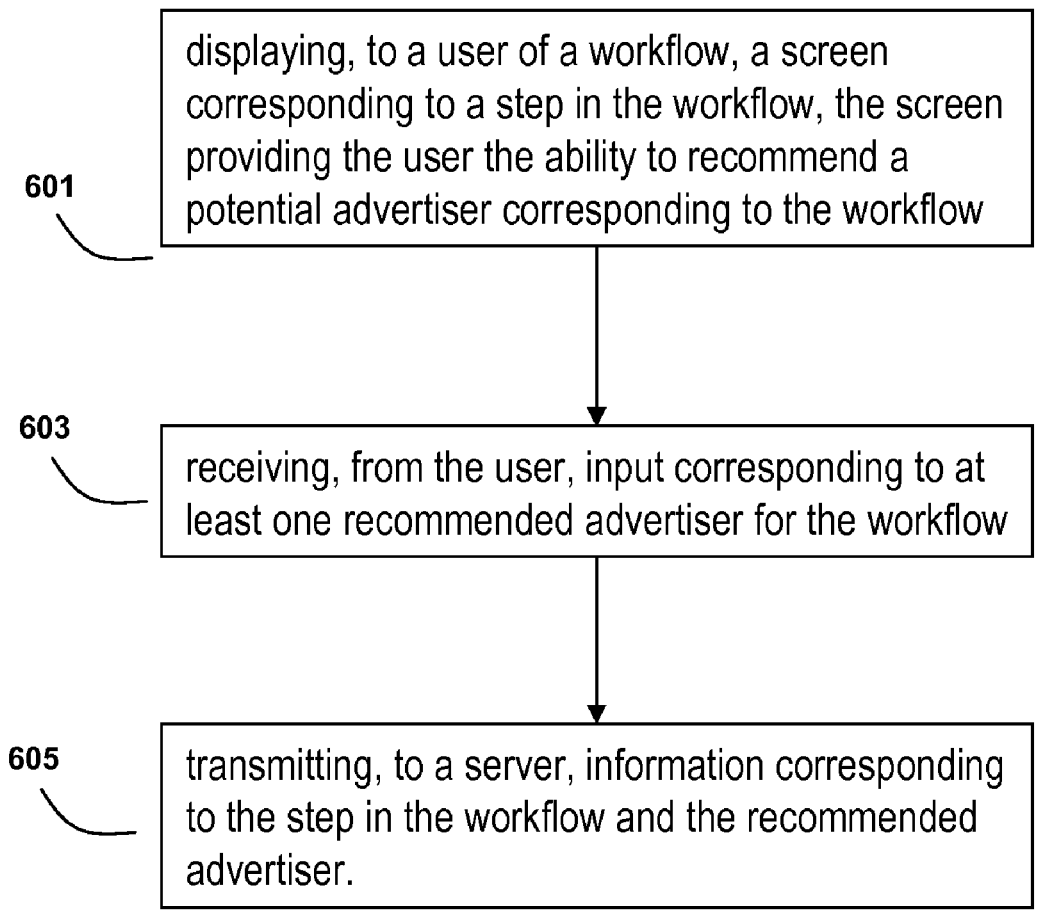
FIG. 6 is a block diagram of a method for allowing targeted advertisements to be recommended by users of workflow software.

Referring now to FIG. 6, a flow diagram of a method for allowing targeted advertisements to be recommended by users of workflow software is shown. In brief overview, the method comprises: displaying, to a user of a workflow, a screen corresponding to a step in the workflow, the screen providing an input for the user to recommend a potential advertiser corresponding to the workflow (step 601); receiving, from the user, input corresponding to at least one recommended advertiser for the workflow (step 603); and transmitting, to a server, information corresponding to the step in the workflow and the recommended advertiser (step 605).

Still referring to FIG. 6, now in greater detail, a method for allowing targeted advertisements to be recommended by users of workflow software comprises: displaying, to a user of a workflow, a screen corresponding to a step in the workflow, the screen providing an input for the user to recommend a potential advertiser corresponding to the workflow (step 601). The workflow step may comprise any workflow step, and may be displayed in any manner.

The input for the user to recommend a potential advertiser corresponding to the workflow may comprise any input described herein. In some embodiments, the input may also collect information relating to a specific workflow step or component that the advertiser may be interested in advertising near. In one embodiment, the input may not inform the user that input results are being used to determine potential advertisers. For example, an input for a user to enter an address to order cleaning supplies may also store that address as a potential advertising contact. In another embodiment, the input may comprise a menu of preselected potential advertisers. In another embodiment, the input may comprise a list of potential vendors, and the user may be asked to rank the products or services of the vendors. In still another embodiment, the input may comprise a prompt asking a user to state whether the user has dealt with a given business previously, and whether the user was satisfied with the business. In still another embodiment, the input may comprise a prompt asking the user to name the best vendor for a given product or service in a given area.

After displaying, to a user of a workflow, a screen corresponding to a step in the workflow, the screen providing an input for the user to recommend a potential advertiser corresponding to the workflow (step 601); a client may receive, from the user, input corresponding to at least one recommended advertiser for the workflow (step 603). The input may be received via any input device. In some embodiments, the input may be stored locally while a user completes a workflow step.

After receiving, from the user, input corresponding to at least one recommended advertiser for the workflow (step 603); a client may transmit, to a server, information corresponding to the step in the workflow and the recommended advertiser (step 605). This information may be transmitted via any network and using any protocol described herein.

In some embodiments, steps 603 and 605 may be performed simultaneously or otherwise overlap. In one embodiment, a user may be prompted to enter a recommended advertiser into a text field, which is in communication with the workflow server. As the user types, the text field may send the input to the workflow server, which then may analyze the partially typed message in order to provide a service, such as auto-completion. For example, the user may type "ab" into a workflow component. The workflow component may transmit the partially typed message to the server, which then may search the user's contact list and identify an entry for "ABC Motors", and then auto-complete the component with the information for ABC motors. The user may then submit the auto-completed form, at which time the information may be transmitted back to the server. A workflow component may use any dynamic input technology, including without limitation Flash, Ajax, Javascript, and Java Applets to provide dynamic features such as these.

Figure 7:
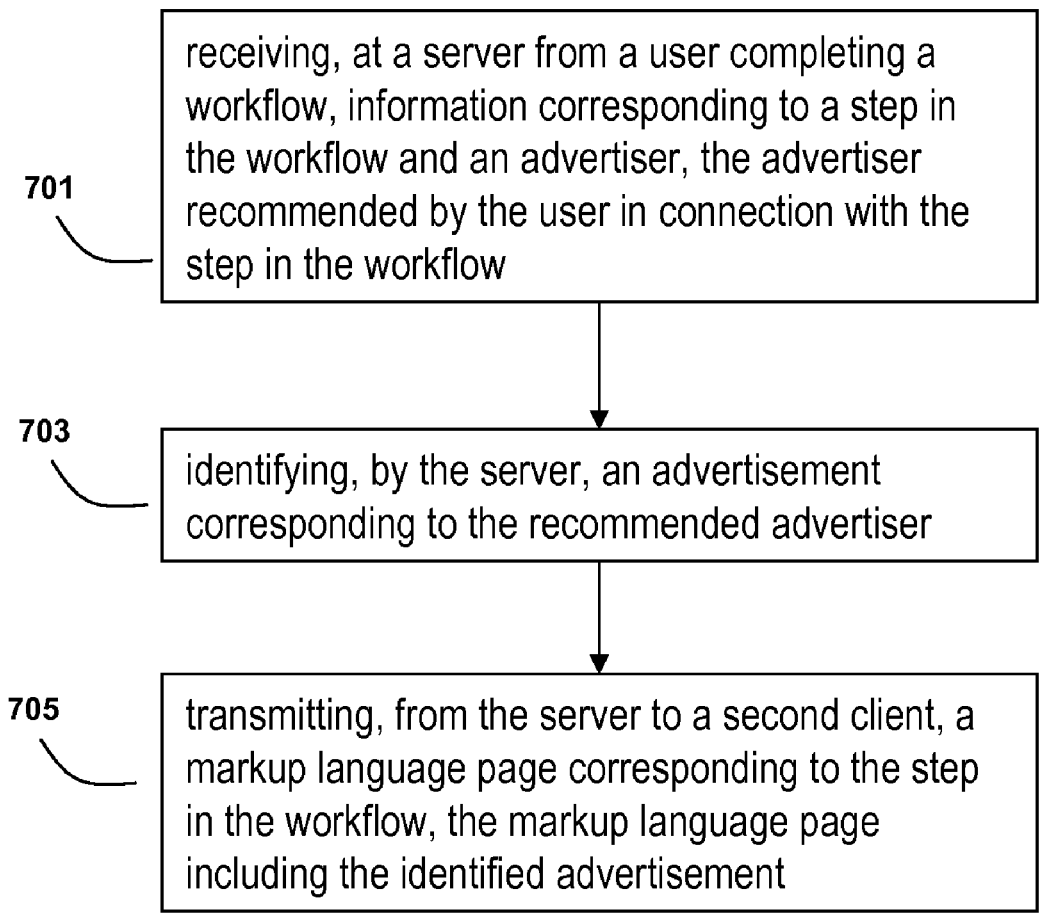
FIG. 7 is a flow diagram of a second method for allowing targeted advertisements to be recommended by users of workflow software and displaying the recommended advertisements to users of the workflow software.

Referring now to FIG. 7, a flow diagram of a second method for allowing targeted advertisements to be recommended by users of workflow software is shown. In brief overview, the method comprises: receiving, at a server from a user completing a workflow, information corresponding to a step in the workflow and an advertiser, the advertiser recommended by the user in connection with the step in the workflow (step 701); identifying, by the server, an advertisement corresponding to the recommended advertiser (step 703); and transmitting, from the server to a second client, a markup language page corresponding to the step in the workflow, the markup language page including the identified advertisement (step 705).

Still referring to FIG. 7, now in greater detail, a second method for allowing targeted advertisements to be recommended by users of workflow software comprises receiving, at a server from a user completing a workflow, information corresponding to a step in the workflow and an advertiser, the advertiser recommended by the user in connection with the step in the workflow (step 701). This information may be received via any network and using any protocol described herein.

In some embodiments, the information may also comprise information relating to a specific workflow step or component that the advertiser may be interested in advertising near.

The server may then identify an advertisement corresponding to the recommended advertiser (step 703). In one embodiment, the server may identify an advertisement from a database of stored advertisements. For example, a workflow step may be displayed to a user along with a menu of potential advertisers for whom the workflow server has ads that may be relevant to the workflow step. The server may then receive the input from the user identifying one or more of the advertisers as relevant to the workflow step. The server may then access a database of advertisements to identify an advertisement corresponding to the identified advertiser.

In one embodiment, the server may also use previous data collected on a particular advertisement to select an ad. For example, an advertiser may have submitted four advertisements for display in conjunction with workflows. The workflow server may determine that one of the ads has a higher rate of responses than the others. If the workflow server then receives a user recommendation to display ads for that advertiser on a given workflow, the workflow server may then select the advertisement that has previously had a high response rate. In another embodiment, the workflow server may select an advertisement that has previously received a high rating from users in a survey or other feedback mechanism.

In some embodiments, the server may contact the advertiser with a request to submit an advertisement. For example, upon receiving a user recommendation that XYZ Corp. should advertise on a property management workflow, a workflow server may send an e-mail to XYZ Corp. informing them of the recommendation, and requesting them to submit advertising materials. In one embodiment, this request may comprise a link to a web site which allows a company to electronically submit advertisements, which are then included in the workflow server's advertisement database. In other embodiments, this request may comprise an instruction to e-mail, call, or otherwise contact personnel responsible for managing the advertising content for the workflows. In still other embodiments, the request may comprise an option for the advertiser to have an advertisement automatically generated by the workflow server. For example, the workflow server may generate an advertisement comprising the name of the advertiser and a text link to the advertiser's web site.

In another embodiment, the workflow software may comprise messages or functionality to enable users to contact and sign up or help sign up potential advertisers. In one embodiment, users may be encouraged to contact potential advertisers and be provided with a telephone number for them or the potential advertisers to call with advertiser leads. In another embodiment, the users may be encouraged to use a previously known telephone number, e-mail address, or URL for purposes of signing-up potential advertisers. In another embodiment, users may be provided with a link or e-mail address to give to potential advertisers, which will then connect the potential advertisers to a sign up procedure for displaying advertisements within the workflow software. In some embodiments, this link may comprise information about the user recommending an advertiser. For example, a user may be provided with a link incorporating a user identifier corresponding to the user. If a potential advertiser then uses the link to sign up for displaying advertisements, the workflow server may recognize the user identifier, and distribute a reward, bonus, or other incentive to the user accordingly. The workflow server may also then mark any advertisements submitted by the advertiser using the link as recommended by the user, and use this information in determining future workflows in which to display the advertisements.

After identifying, by the server, an advertisement corresponding to the recommended advertiser (step 703); the server may then transmit, to a second client, a markup language page corresponding to the step in the workflow, the markup language page including the identified advertisement (step 705). The advertisement may be displayed within the page according to any of the embodiments described herein. In some embodiments, information relating to identifying the advertisement (step 703) may be displayed along with the advertisement. For example, an advertisement may be displayed along with text stating "98% of workflow software users who used this advertiser were happy with the results," or "This advertiser was given the highest quality rating in a survey of users of this workflow," or "This advertiser was identified by someone in your geographic area as a high-quality business."

While the invention has been particularly shown and described with reference to specific preferred embodiments, it should be understood by those skilled in the art that various changes in form and detail may be made therein without departing from the spirit and scope of the invention as defined by the appended claims.

We claim:

1. A method for allowing targeted advertisements to be recommended by users of workflow software, the method comprising:
   (a) transmitting by a server, to a client, data representing a screen providing an input for a user of the client to recommend a potential advertiser corresponding to a first or second step in the workflow;
   (b) receiving at the server, from the client, input corresponding to at least one recommended advertiser for the first or second step in the workflow; and
   (c) storing in a memory element provided by the server the at least one recommended advertiser in association with the first or second step in the workflow.

2. The method of claim 1, wherein step (a) comprises transmitting by a server, to a client, data representing a screen corresponding to the first or second step in the workflow, the screen providing an input for the user to recommend a potential advertiser corresponding to the first or second step in the workflow.

3. The method of claim 1, wherein step (a) comprises transmitting by a server, to a client, data representing a screen corresponding to the first or second step in the workflow, the screen providing an input for the user to recommend a potential advertiser corresponding to the first or second step in the workflow, wherein the screen and the input do not declare the input will be used to determine potential advertisers.

4. The method of claim 1, wherein step (a) comprises transmitting by a server, to a client, data representing a screen corresponding to the first or second step in the workflow, the screen providing an input for the user to recommend a potential advertiser corresponding to the first or second step in the workflow via a menu of potential advertisers.

5. The method of claim 1, wherein step (a) comprises transmitting by a server, to a client, data representing a screen corresponding to the first or second step in the workflow, the screen providing an input for the user to recommend a potential advertiser corresponding to the first or second step in the workflow via a menu of potential advertisers preselected as potentially relevant to the first or second step in the workflow.

6. The method of claim 1, wherein step (a) comprises transmitting by a server, to a client, data representing a screen corresponding to the first or second step in the workflow, the screen providing an input for the user to recommend a potential advertiser corresponding to one of: the workflow, the first or second step in the workflow, a given component within the first or second step, or an occupational role corresponding to the workflow.

7. The method of claim 1, wherein step (a) comprises transmitting by a server, to a client, data representing a screen corresponding to the first or second step in the workflow and comprising at least one markup language page, the screen having at least one input comprising means for recommending a potential advertiser corresponding to the first or second step in the workflow.

8. The method of claim 1, wherein step (a) comprises transmitting by a server, to a client, data representing a screen corresponding to the first or second step in the workflow, the screen comprising first input means for the user to enter a contact, and second input means for recommending the contact as a potential advertiser corresponding to the first or second step in the workflow.

9. The method of claim 1, further comprising the steps of:
   (d) transmitting by the server information corresponding to an advertisement to be displayed in conjunction with the data representing the screen, the advertisement corresponding to the recommended advertiser.

10. The method of claim 1 further comprising the step of (d) notifying, by the server, the recommended advertiser of the user recommendation.

11. The method of claim 10 wherein the recommended advertiser is notified in one of the following ways: by electronic mail; by facsimile, by instant message, by an SMS message; an RSS feed; by letter; by telephone, or by personal visit.

12. A method for allowing targeted advertisements to be recommended by users of workflow software, the method comprising:
   (a) receiving, at a server from a user completing a workflow at a first client, information corresponding to a first or second step in the workflow and an advertiser, the advertiser recommended by the user in connection with the first or second step in the workflow;
   (b) identifying, by the server, an advertisement corresponding to the recommended advertiser; and
   (c) transmitting, from the server to a second client, a markup language page corresponding to the first or second step in the workflow, the markup language page including the identified advertisement.

13. The method of claim 12 wherein step (b) comprises identifying, by the server, an advertisement corresponding to the recommended advertiser responsive to the identity of the user making the recommendation.

14. The method of claim 12 wherein step (b) comprises identifying, by the server, an advertisement corresponding to the recommended advertiser responsive to the workflow.

15. The method of claim 12 wherein step (b) comprises identifying, by the server, an advertisement corresponding to the recommended advertiser responsive to a count identifying the number of times the identified advertisement has been served.

16. The method of claim 12 wherein step (b) comprises identifying, by the server, an advertisement corresponding to a rating given to the identified advertisement by a plurality of users.

17. An apparatus serially providing a plurality of web pages comprising a workflow, the web pages including targeted advertisements recommended by users of the workflow, the apparatus comprising:

a receiver in communication with, via a network, a user completing a workflow via a client, the receiver receiving from the client information corresponding to a first or second step in the workflow and an advertiser recommended by the user in connection with the first or second step in the workflow;

an advertisement engine in communication with the receiver, the engine identifying an advertisement corresponding to the recommended advertiser;

a markup language page generator in communication with the advertisement engine, the markup language page generator creating a page corresponding to the first or second step in the workflow and including the identified advertisement; and a transmitter in communication with the markup language page generator and, via the network, the client, the transmitter sending to the client the created page.

18. The apparatus of claim 17 wherein the advertisement engine identifies the advertisement on the basis of at least one of the following: the identity of the client making the recommendation; the first or second step in the workflow; a count of the number of times the identified advertisement has been served; or a rating given to the identified advertisement by a plurality of clients.

19. The apparatus of claim 17 wherein the advertisement engine further comprises an rules engine, the rules engine identifying an advertisement corresponding to the recommended advertiser.

20. The apparatus of claim 17 wherein the markup language page generator creates an HTML page.

21. The apparatus of claim 17 further comprising a database in communication with the advertisement engine and the markup language page generator, the database storing a plurality of advertisements.

* * * * *